Patented May 23, 1933

1,910,579

UNITED STATES PATENT OFFICE

DOUGLAS FRANK TWISS, OF BIRMINGHAM, ENGLAND, ASSIGNOR TO AMERICAN ANODE INC., OF AKRON, OHIO

PROCESS FOR THE CATHODIC DEPOSITION OF RUBBER DISPERSIONS

No Drawing. Application filed June 8, 1928, Serial No. 284,014, and in Great Britain July 25, 1927.

It is known that in an electric field the globules of a rubber dispersion, especially of rubber latex, migrate—owing to their negative charge—towards the anode and may be collected there in the shape of a coherent deposit. A number of processes have been based on this phenomenon, for example, the process described in U. S. Patent No. 1,476,374, by means of which it is possible to manufacture rubber goods directly from the rubber dispersions, especially from rubber latex, thus avoiding the complicated methods of working required by the generally used methods for manufacturing rubber goods from raw rubber.

It is also well-known that it is possible to deposit simultaneously with the rubber, compounding substances, mixed in a finely divided state with the rubber dispersion. For example, filling substances, vulcanizing substances, accelerators and dyes may be added to a rubber dispersion and deposited with the rubber so as to be very evenly distributed within the latter. In order to render this possible, it is, of course, necessary, that the dispersed particles of the compounding substances should likewise possess negative charges. Now there exist certain compounding substances, such as the sols of iron oxide or aluminium oxide, or of colloidal silicon dioxide, which during the production of the sols assume a positive electric charge, so that they cannot be added to the rubber dispersion without causing co-agulation. Moreover, they migrate towards the cathode and not towards the anode as do the negatively charged rubber globules.

A further circumstance, which must be taken into consideration in connection with the method of depositing rubber by means of electricity, is the fact, that owing to the electrolytic dissociation taking place simultaneously with the electrophoretic effect of the current, oxygen is liberated at the anode, producing a porous and unhomogeneous rubber deposit.

In order to avoid this drawback, it has been proposed to separate the surface upon which the rubber is deposited from the anode upon which the oxygen is liberated, by surrounding the anode with a porous diaphragm, or in cases where it is desired to avoid this, to employ various means of depolarization. Under certain circumstances, however, the combination of the oxygen with depolarizing agents may cause difficulties.

According to this invention the above-mentioned inconveniences are avoided by preserving the rubber dispersion with an agent which imparts a positive charge to the dispersed particles, or if the dispersion has been preserved by means of a preserving agent imparting a negative charge to its particles, this charge is reversed in order to impart to the rubber particles a positive charge, and the dispersed particles are separated from the dispersion and deposited by cataphoresis. Hence the rubber particles will no longer migrate in the electric field towards the anode, but toward the cathode, and be deposited thereon.

To such a positively charged rubber dispersion, compounding substances the particles of which acquire a positive charge when dispersed in an aqueous medium, may be admixed without any difficulties, these compounding substances being deposited at the cathode together with the rubber. In this case, the hydrogen which is formed at the cathode can easily be fixed, for instance, by using a cathodic depositing mould coated with an easily reduced metal oxide, such as lead peroxide. It is well-known that lead moulds can be coated, as it is done with the electrodes of storage batteries, in a bath of sulphuric acid, with a layer of oxide which is easily reduced and after use can be regenerated in a simple manner. When this method is employed the substance of which the depositing moulds are made is not dissolved during cataphoresis, and does not enter the rubber deposit, as does the zinc if rubber is deposited from negatively charged rubber dispersions on an anodic zinc mould. Another advantage of the new method is that the cleaning of the metallic depositing moulds after each use is avoided.

The hydrogen liberated at the cathode may also be fixed by means of substances added to the dispersion. It is well known that the reversal of the charge of a rubber dispersion, especially of rubber latex, may be effected by adding an acid, in a substantial excess above the quantity causing coagulation. For this purpose for example acetic acid or sulphuric acid may be used. It has been proposed to dilute, for this purpose, the natural rubber latex before adding the acid, with a tenfold quantity of water.

I have, however, found, that the time of deposition is substantially increased by such dilution. In order to avoid this drawback, the rubber dispersion is re-concentrated after it has been diluted by addition of acid for the purpose of reversal of its charge. This reconcentration may be effected by evaporation, centrifuging or by any other convenient method.

As a specific example of one embodiment of the invention, the ammonia is removed from ammonia-preserved natural rubber latex by aeration. 100 parts by volume of the substantially ammonia-free latex are diluted with 400 parts distilled water and rapidly mixed with 75 parts concentrated acetic acid. The acetic acid reverses the charge on the rubber particles from negative to positive, without coagulating the latex. The acid latex is concentrated to approximately its former concentration by centrifuging, and is placed in an electrophoretic cell containing a lead cathode coated with lead peroxide, and a carbon anode. The electric current deposits a firm, coherent deposit of rubber on the cathode, from which it later stripped. The deposit may be dried and vulcanized in the usual manner.

The new method can be applied not only to natural rubber latex or natural dispersions of rubber like substance, as e. g. gutta percha and balata, but also to artificial dispersions of rubber, vulcanized waste rubber, reclaimed rubber or dispersions of other organic substances, which behave in a manner similar to rubber. A mixture of several of the dispersions referred to may also be employed. It is also possible to vulcanize the rubber like substances in dispersed state, in a manner known per se. The dispersion may or may not contain additional filling or compounding substances at any description.

Having now hereinbefore described and ascertained the nature of my invention and how the same is to be performed, I declare that what I claim is:—

1. The method of producing rubber goods from an aqueous dispersion of rubber which comprises imparting a positive charge to the particles of the said dispersion, and electrodepositing the charged particles on the cathode of an electrophoretic cell.

2. The method of producing rubber goods from an aqueous dispersion of rubber which comprises imparting a positive charge to the particles of the said dispersion, and electrodepositing the charged particles on a metallic cathode covered with a coating of an oxidizing substance.

3. The method of producing rubber goods from an aqueous dispersion of rubber which comprises imparting a positive charge to the particles of the said dispersion, and electrodepositing the charged particles on a lead cathode coated with lead peroxide.

4. The method of producing rubber goods which comprises reversing the charge of a negatively charged rubber dispersion, and electrodepositing the positively charged rubber particles on a cathode.

5. The method of producing rubber goods which comprises mixing with a negatively charged rubber dispersion a quantity of acid in considerable excess over the quantity which will coagulate the dispersion, and electrodepositing the positively charged rubber particles on a cathode.

6. The method of producing rubber goods which comprises diluting a negatively charged aqueous dispersion of rubber, adding a quantity of acid in considerable excess over the quantity which will coagulate the dispersion, reconcentrating the positively charged dispersion, and electrodepositing the rubber on a cathode.

7. The method of producing rubber goods which comprises imparting a positive charge to the particles of an aqueous dispersion of rubber, adding thereto compounding substances finely dispersed in an aqueous medium, the particles of the said substances likewise possessing a positive charge, and electrodepositing the rubber and the compounding substances simultaneously on the cathode of an electrophoretic cell.

8. The method of producing rubber goods which comprises reversing the charge of a negatively charged rubber dispersion, adding a positively charged dispersion of compounding substances, increasing the concentration of the mixture and electrodepositing the positively charged particles on a cathode.

In testimony whereof I affix my signature.

DOUGLAS FRANK TWISS.